(12) United States Patent
Mosquera et al.

(10) Patent No.: US 11,377,302 B2
(45) Date of Patent: Jul. 5, 2022

(54) DISTRIBUTING POWDER

(71) Applicant: HEWLETT-PACKARD DEVELOPMENT COMPANY, L.P., Houston, TX (US)

(72) Inventors: Gerard Mosquera, Sant Cugat del Valles (ES); Albert Iglesias Millan, Sant Cugat del Valles (ES); Joan Mach, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 858 days.

(21) Appl. No.: 16/081,803

(22) PCT Filed: May 12, 2016

(86) PCT No.: PCT/US2016/032003
§ 371 (c)(1),
(2) Date: Aug. 31, 2018

(87) PCT Pub. No.: WO2017/196326
PCT Pub. Date: Nov. 16, 2017

(65) Prior Publication Data
US 2021/0214167 A1    Jul. 15, 2021

(51) Int. Cl.
*B65G 27/18*    (2006.01)
*B65G 27/04*    (2006.01)
*B29C 64/329*   (2017.01)
*B33Y 40/00*    (2020.01)

(52) U.S. Cl.
CPC ............ *B65G 27/18* (2013.01); *B29C 64/329* (2017.08); *B65G 27/04* (2013.01); *B33Y 40/00* (2014.12); *B65G 2201/042* (2013.01)

(58) Field of Classification Search
None
See application file for complete search history.

(56) References Cited

U.S. PATENT DOCUMENTS 5,108,589 A * 4/1992 Sherman ............... B07B 1/4609
209/393
5,669,042 A    9/1997 Kobayashi et al.
(Continued)

FOREIGN PATENT DOCUMENTS

CN    102015258    4/2011
CN    203863022    10/2014
(Continued)

OTHER PUBLICATIONS

International Search Report and Written Opinion for International Publication No. PCT/US2016/032003 dated Jan. 13, 2017, 10 pages.
(Continued)

*Primary Examiner* — Kavel Singh
(74) *Attorney, Agent, or Firm* — Dierker & Kavanaugh (57) ABSTRACT

In one example, an article for distributing powder includes a plate having holes therein through which a powder may pass from a first side of the plate to a second side of the plate opposite the first side and multiple ramps each intersecting the plate at one or multiple holes and sloping away from the first side of the plate in a first direction at an angle less than 90°.

11 Claims, 14 Drawing Sheets

(56) References Cited

U.S. PATENT DOCUMENTS

| | | | | |
|---|---|---|---|---|
| 5,746,322 | A | * | 5/1998 | LaVeine .................... B07B 1/12 209/393 |
| 5,828,928 | A | | 10/1998 | Sasago et al. |
| 7,464,802 | B2 | * | 12/2008 | Gerrity .................... B07B 1/24 194/347 |
| 7,506,766 | B2 | * | 3/2009 | Mathis, Jr. .............. C13B 10/06 209/261 |
| 7,665,614 | B2 | * | 2/2010 | Malmberg ................ B07B 1/46 209/264 |
| 9,630,786 | B1 | * | 4/2017 | Svejkovsky ....... B65G 47/5186 |
| 2001/0050448 | A1 | | 12/2001 | Kubo et al. |
| 2009/0206522 | A1 | | 8/2009 | Hein et al. |
| 2011/0300248 | A1 | | 12/2011 | Tung et al. |
| 2014/0163717 | A1 | | 6/2014 | Das et al. |

FOREIGN PATENT DOCUMENTS

| | | |
|---|---|---|
| CN | 104837607 | 8/2015 |
| CN | 105339114 | 2/2016 |
| CN | 105408039 | 3/2016 |
| CN | 106180712 | 12/2016 |
| CN | 107530970 | 1/2018 |
| JP | 2001-150557 | 6/2001 |
| JP | 2009-279624 | 12/2009 |
| JP | 2009-279928 | 12/2009 |
| JP | 2015-182303 | 10/2015 |
| JP | 2016003362 | 1/2016 |
| WO | WO-2006121374 | 11/2006 |
| WO | WO-2014-044676 | 3/2014 |
| WO | WO-2017005301 A1 | 1/2017 |

OTHER PUBLICATIONS

Scott, Soon-to-Be-Released Aether 1 3D Printer Can Do Absolutely Everything, 3DPrint.com. Mar. 21, 2016, https://3dprint.com/125290/aether-1-multi-printer/.

* cited by examiner

DISTRIBUTING POWDER

BACKGROUND

Additive manufacturing machines, sometimes called 3D printers, produce objects by building up layers of material. Digital data may be processed into slices each defining that part of a layer or layers of build material to be formed into the object. In some additive manufacturing machines, the object slices are formed in a powdered build material spread in layers over the work area. Heat may be used to fuse together the particles in each of the successive layers of powder to form a solid object. Heat to fuse build material in each layer may be generated, for example, by applying a liquid fusing agent to the powder in the pattern of a single slice of the object and then exposing the patterned area to a light or other energy source. The fusing agent absorbs energy to help sinter, melt or otherwise fuse the patterned powder. Manufacturing may proceed layer by layer and slice by slice until the object is complete.

DRAWINGS

The figures are not necessarily to scale. The same part numbers designate the same or similar parts throughout the figures.

DESCRIPTION

A system has been developed for additive manufacturing to move powdered build material from a supply reservoir to a staging area where the powder is presented to a spreader roller or other device for layering over the work area. The system utilizes a mechanical feeder that distributes powder from a point source inlet at the bottom of a trough to a line feed outlet at the top of the trough where the powder can be presented to the layering device across a full width of the work area. The feeder allows powder to be supplied more efficiently from a reservoir located below the work area by enabling the delivery of powder from the reservoir to a point, rather than to an area or along a line.

The examples described below and shown in the figures illustrate but do not limit the scope of the patent, which is defined in the Claims following this Description.

Figure 1:
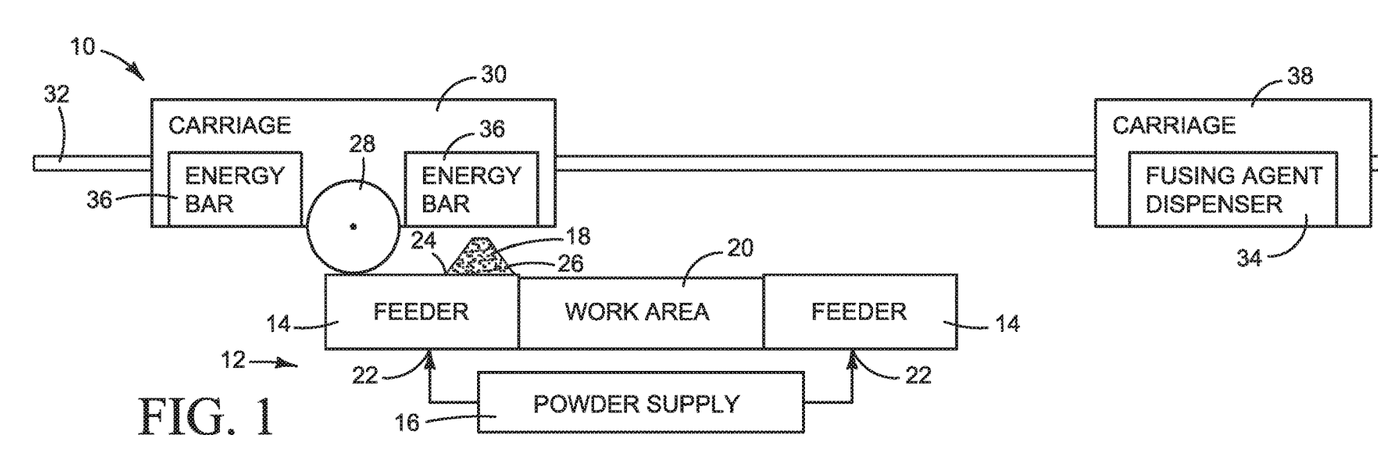
FIGS. 1 and 2 are block diagrams illustrating an additive manufacturing machine implementing a powdered build material supply system with one example of a powder feeder.
Figure 2:
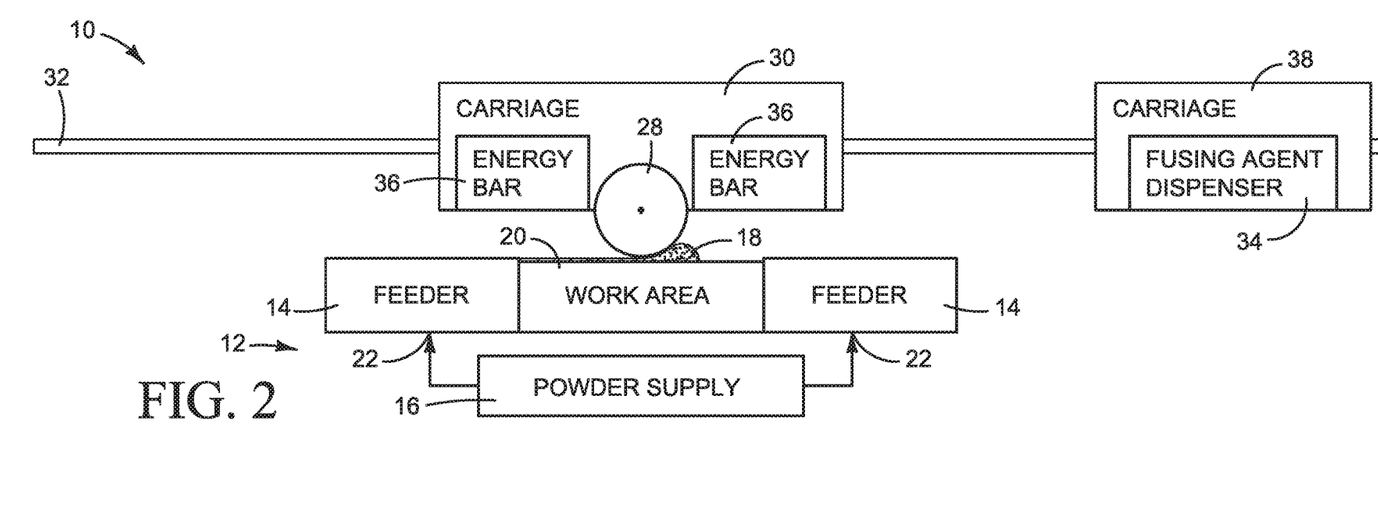

FIGS. 1 and 2 are block diagrams illustrating an additive manufacturing machine 10 implementing a powdered build material supply system 12 with one example of a powder feeder 14. FIGS. 3-17 illustrate an example feeder 14 in detail. Machine 10 in FIGS. 1 and 2 is just one example of an additive manufacturing machine for implementing a supply system 12. Examples of a supply system 12 may be implemented in other types or configurations of additive manufacturing machines. Also, examples of a feeder 14 are not limited to powder supplies for additive manufacturing, but could also be implemented in other powder distribution machines or systems.

Figure 22:
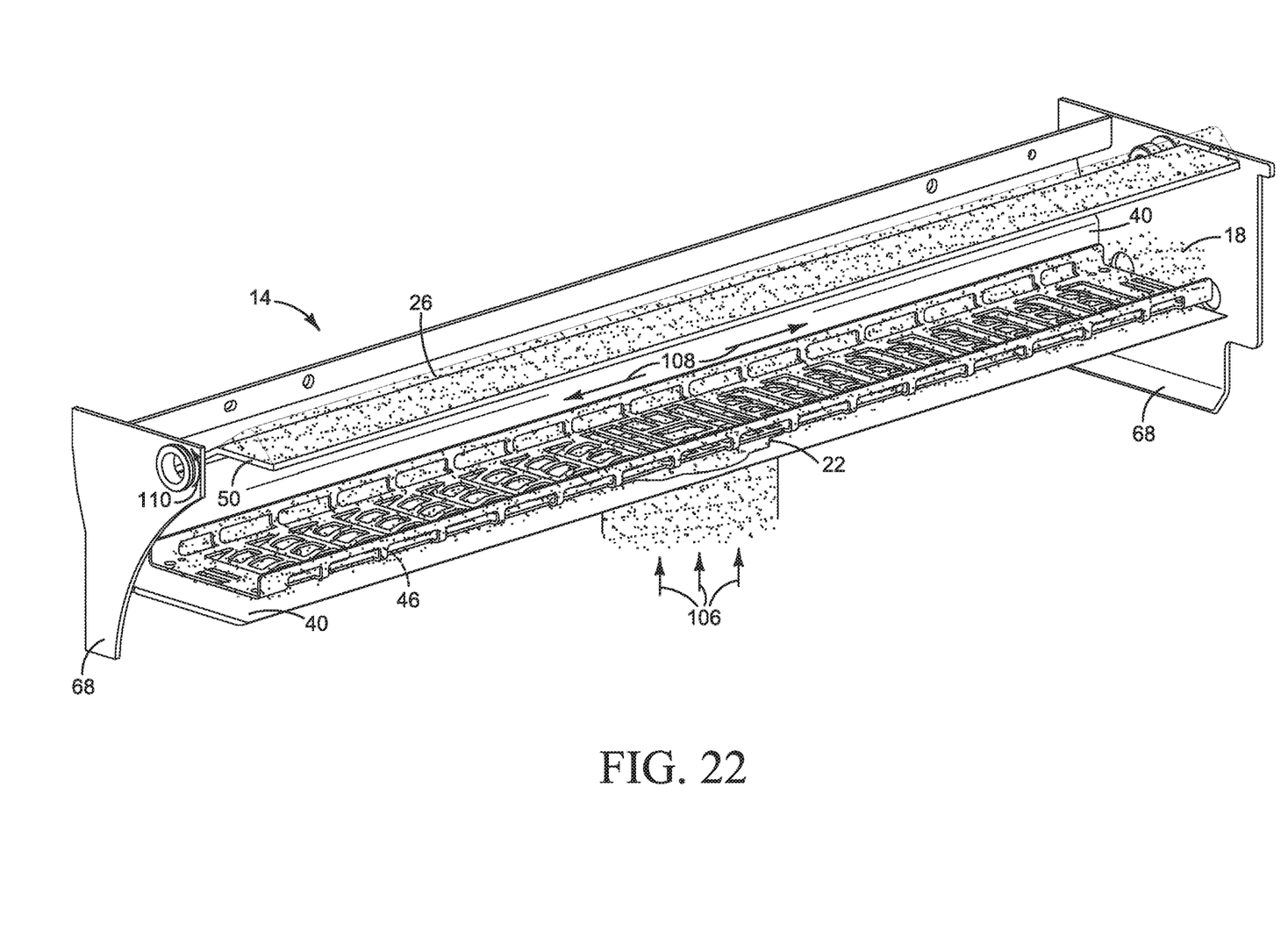

Referring to FIGS. 1 and 2, additive manufacturing machine 10 includes a supply system 12 with feeder 14 and supply reservoir 16 operatively connected feeder 14 to supply powdered build material 18 to a work area 20. Feeder 14 in FIGS. 1 and 2 is configured to distribute powder from a point source inlet 22 to a line feed outlet 24 where an elongated pile 26 of powder 18 (FIG. 1) is presented to a spreader roller 28 for layering over work area 20. Although not apparent in the block diagram of FIG. 1, powder pile 26 extends the full width of work area 20, for example as shown in FIG. 22. In the example shown in FIGS. 1 and 2, a single powder reservoir 16 supplies a feeder 14 on each side of work area 20. A point source inlet to feeder 14 helps enable more options for delivering powder from a supply reservoir 16. For example, powder may be pumped or augered through a closed conduit from a single supply reservoir 16 to a feeder 14 on one side of work area 20, or to feeders 14 on both sides of work area 20.

Spreader roller 28 is mounted to a movable carriage 30 that carries roller 28 back and forth over work area 20, for example along a rail 32. In the example shown, a feeder 14 is located at each side of work area 20 so that build material 18 can be presented to spreader roller 28, and thus layered on to work area 20, as roller 28 passes back and forth over the work area. FIG. 2 shows roller 28 layering powdered build material 18 over work area 20.

Additive manufacturing machine 10 in FIGS. 1 and 2 also includes a fusing agent dispenser 34 and a source 36 of light or other fusing energy. In this example, fusing agent dispenser 34 is mounted to a movable carriage 38 that carries dispenser 34 back and forth over work area 20 on rail 32. Also, in this example, energy source 36 is implemented as a pair of energy bars 36 mounted to roller carriage 30. In operation, a fusing agent is selectively applied to layered build material in a pattern corresponding to an object slice, as fusing agent dispenser 34 on carriage 38 is moved over work area 20. One or both energy bars 36 are energized to expose the patterned area to light or other electromagnetic radiation to fuse build material where fusing agent has been applied, as carriage 28 carrying energy bars 36 is moved over work area 20. The fusing agent absorbs energy to help sinter, melt or otherwise fuse the patterned build material. Manufacturing may proceed layer by layer and slice by slice until the object is complete. A "work area" as used herein means any suitable structural area to support or contain build material for fusing, including underlying layers of build material and in-process slice and other object structures.

FIGS. 3-17 illustrate one example of a feeder 14, such as might be used in a build material supply system 12 for an additive manufacturing machine 10 shown in FIGS. 1 and 2. The orientation of some of the parts is described with reference to X, Y and Z axes in a three dimensional Cartesian coordinate system in which the X, Y, and Z directions or axes are orthogonal to one another, a plane defined by two axes is orthogonal to a plane formed by any other two axes, and one plane formed by two axes is parallel to any other plane formed by those same two axes.

Figure 3:
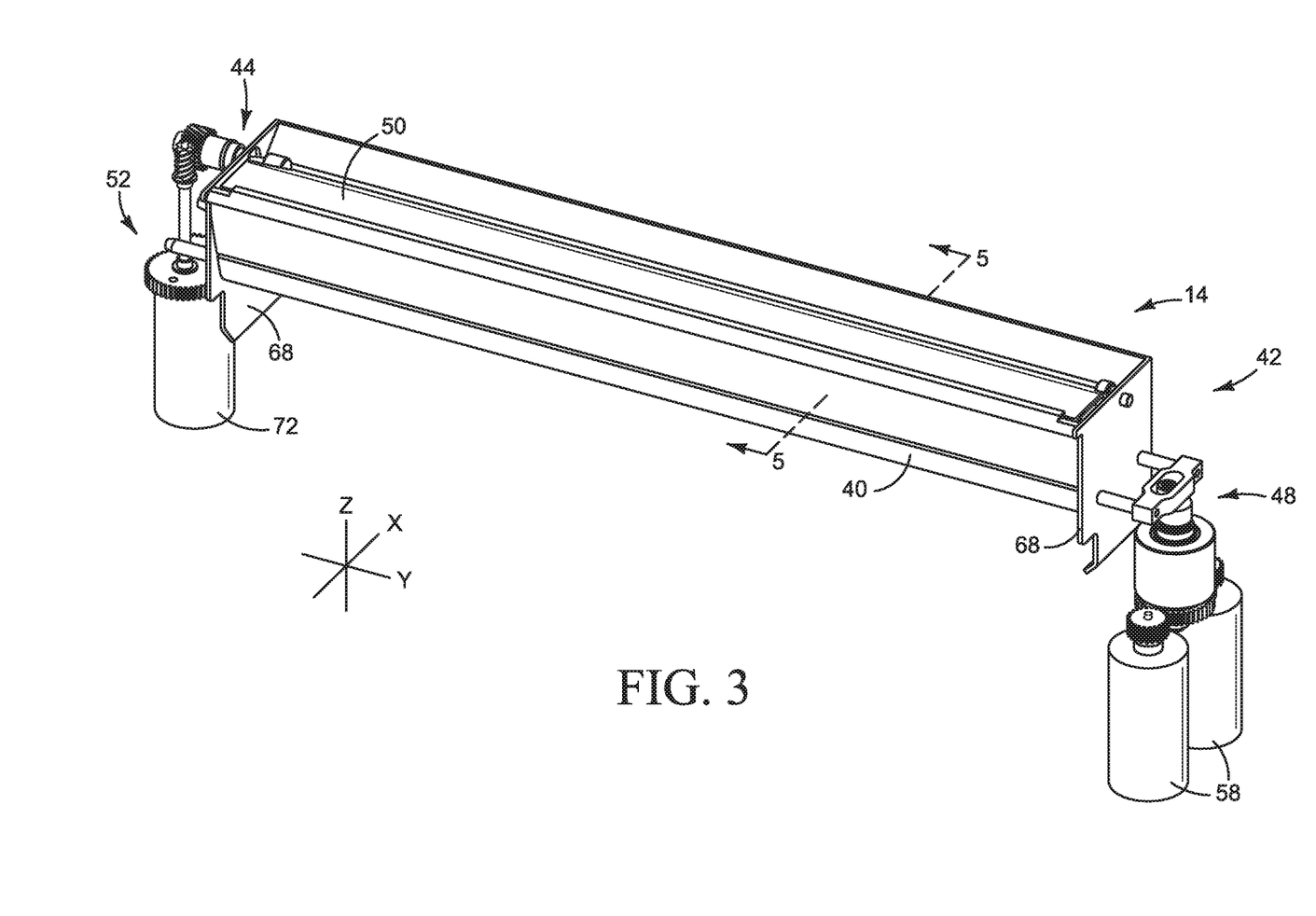
FIGS. 3 and 4 are perspectives illustrating one example of a powder feeder, such as might be used in the build material supply system for the additive manufacturing machine shown in FIGS. 1 and 2.
Figure 4:
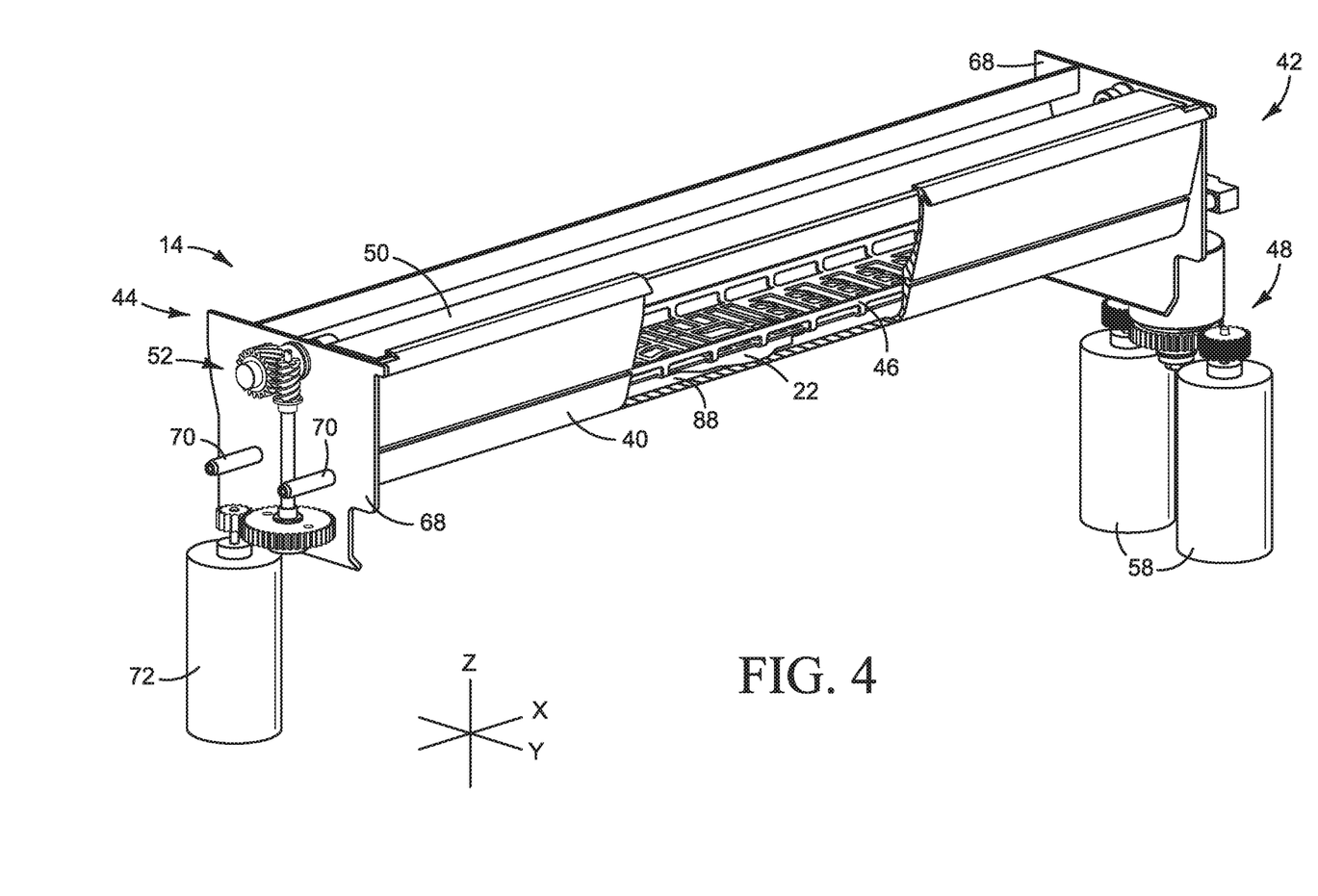
Figures 5, 6:
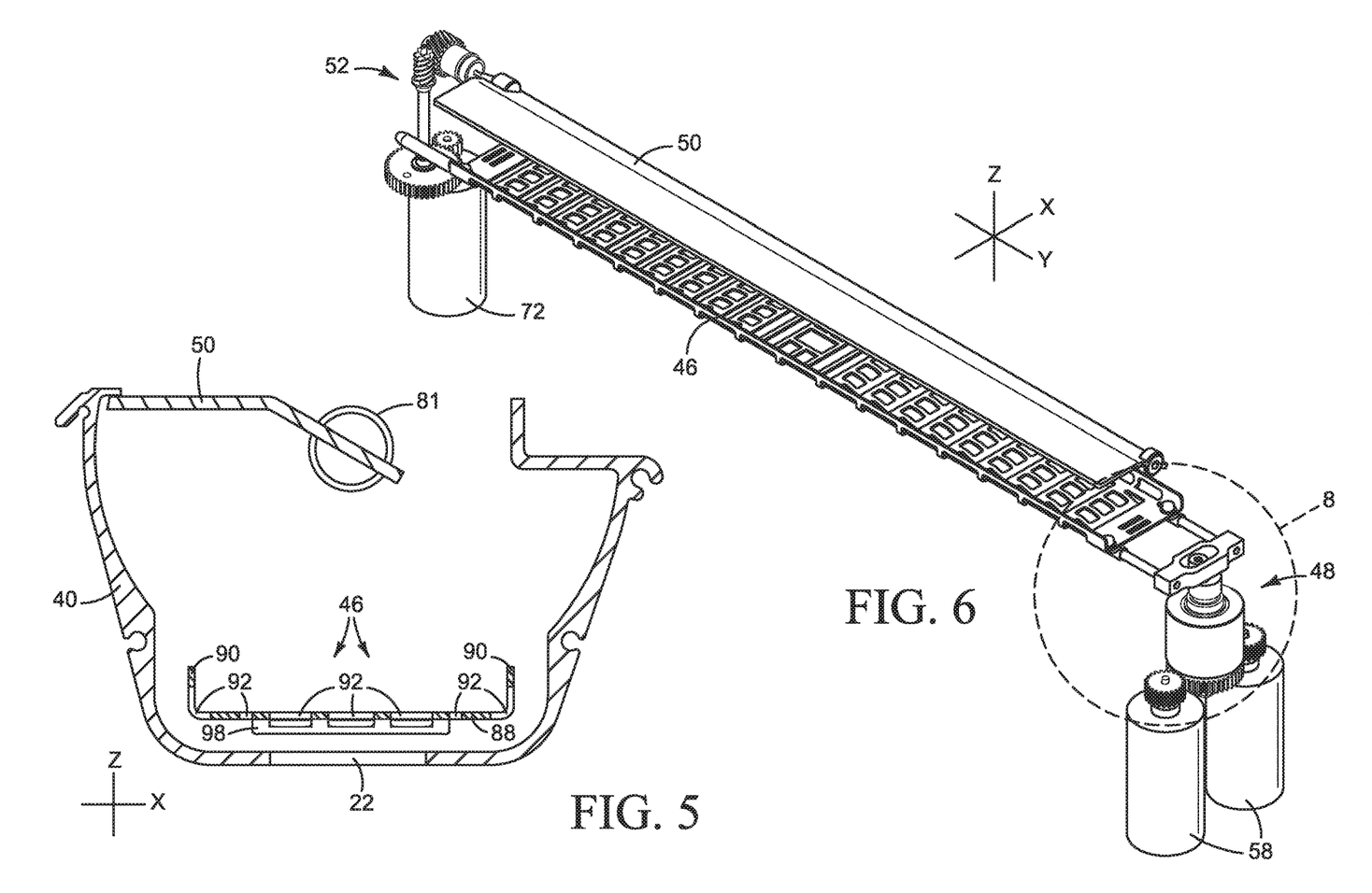
FIG. 5 is a section taken along the line 5-5 in FIG. 3.
FIGS. 6 and 7 are perspectives of the example feeder shown in FIGS. 3-5 with the trough removed to better illustrate the powder distributor and the powder dispenser.

Referring first to FIGS. 3-5, feeder 14 includes a trough 40, a powder distributor 42 to distribute powder along the length of trough 40, and a dispenser 44 to dispense powder from trough 40, for example to a spreader roller 28 shown in FIGS. 1 and 2. Part of trough 40 is cut-away in FIG. 4 to more clearly show the components of distributor 42 and dispenser 44. Distributor 42 includes an apertured plate 46 inside trough 40 and a reciprocating linear actuator 48 to vibrate plate 46. Dispenser 44 includes a vane 50 and a rotary actuator 52 to rotate vane 50. As described in detail below with reference to FIGS. 18-22, the reciprocating action of plate 46 distributes powder away from a central inlet at the bottom of trough 40 so that the powder can be swept up by vane 50 along the full length of the trough and, for example, presented to a layering device across the full width of a work area in an additive manufacturing machine.

Figure 7:
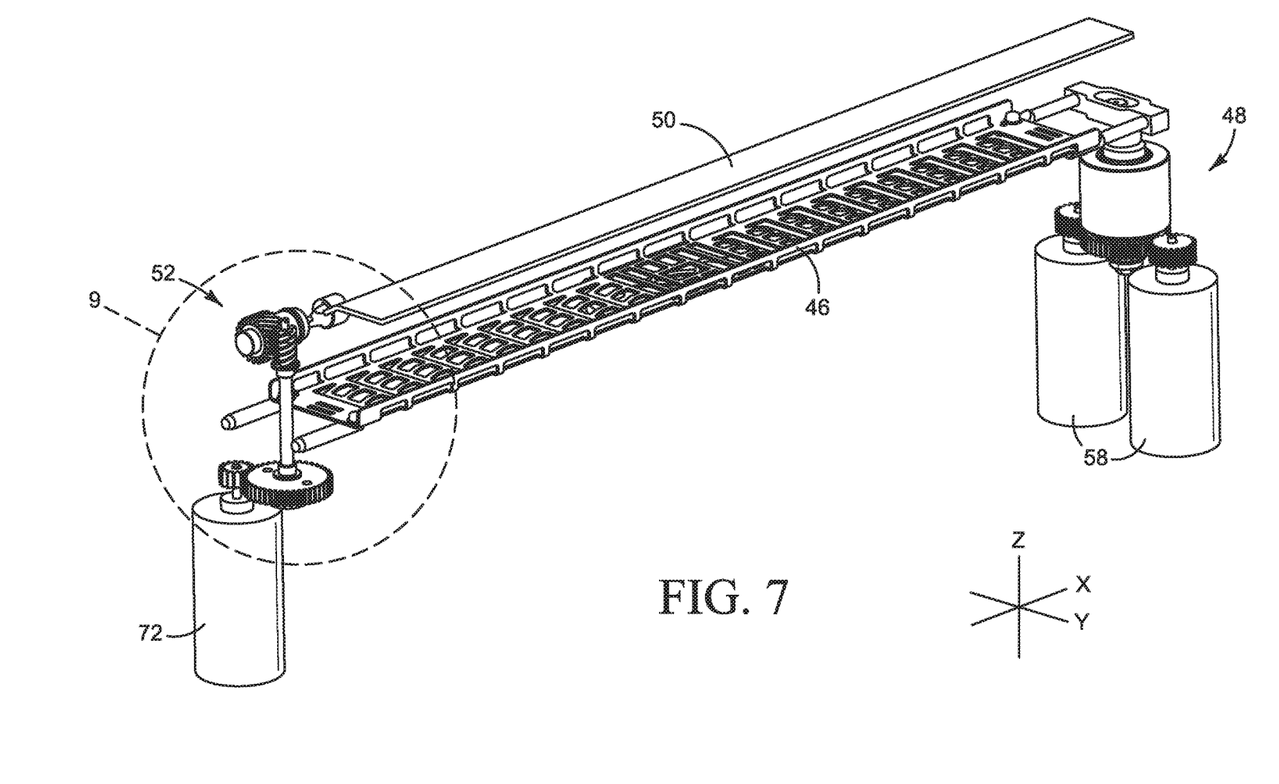
Figure 8:
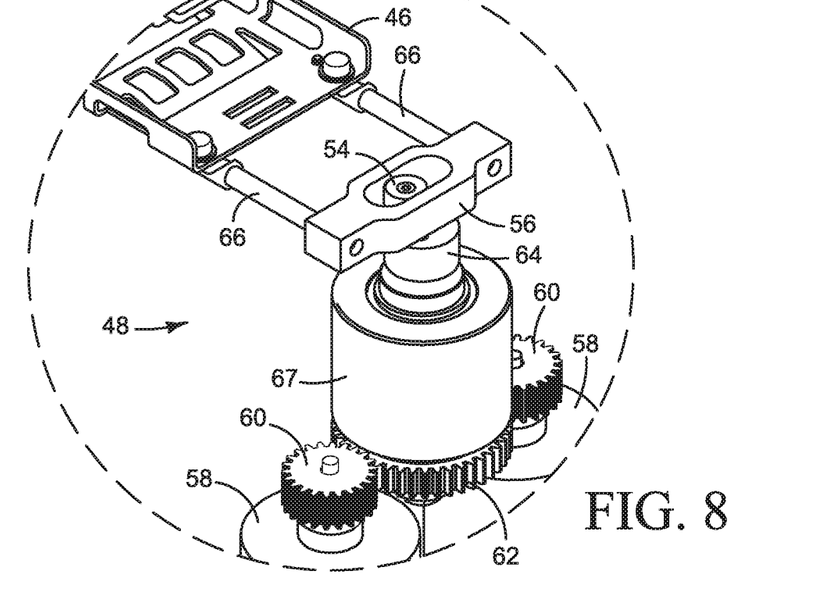
FIGS. 8 and 9 are details from FIGS. 6 and 7, respectively.
Figure 9:
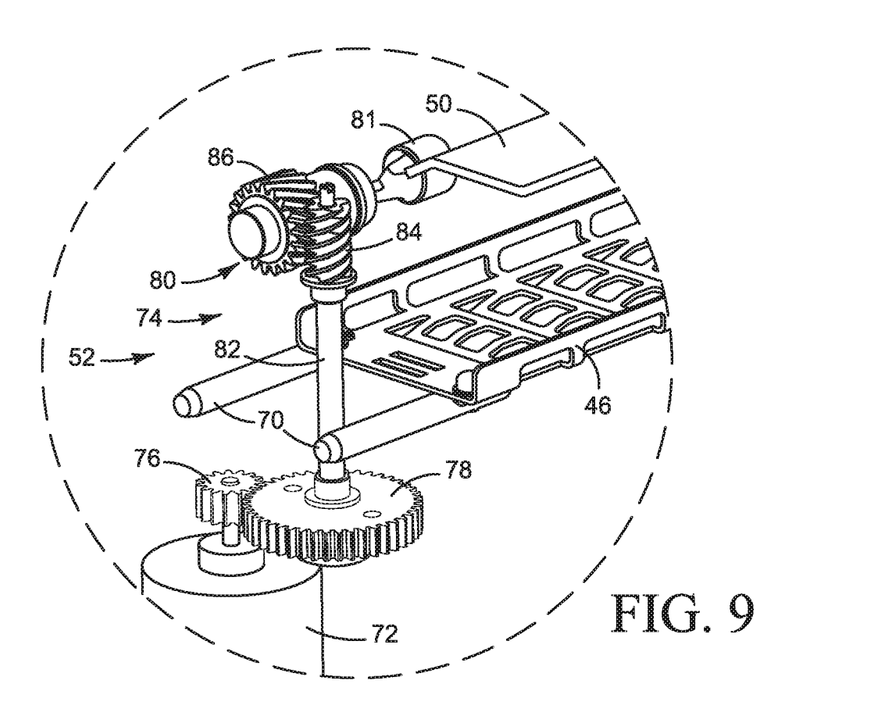

Trough 40 is omitted from the perspectives of FIGS. 6 and 7 to better illustrate some of the components of distributor 42 and dispenser 44. FIGS. 8 and 9 are details taken from FIGS. 6 and 7, respectively. Referring now also to FIGS. 6-9, in this example linear actuator 48 for distributor 42 includes an eccentric 54 and a follower 56 to generate the desired reciprocating motion in plate 46. As best seen in FIG. 8, motors 58 drive eccentric 56 through motor drive gears 60 and a reduction gear 62 connected to an axle 64. Follower 56 transmits reciprocating linear motion to plate 46 through a pair of drive shafts 66. A flywheel 67 connected to eccentric 54 may be used to help maintain proper motion control to achieve the desired powder distribution along plate 46. As shown in FIGS. 3 and 4, plate 46 is supported in a chassis 68 on drive shafts 66 at one end and on shafts 70 at the other end. Bushings or other suitable bearings (not shown) are interposed between chassis 68 and shafts 66, 70 to allow the shafts to slide in the chassis.

As best seen in FIG. 9, rotary actuator 52 for dispenser 44 includes a motor 72 operatively connected to vane 50 through a drive train 74. In this example, drive train 74 includes a motor drive gear 76, reduction gear 78 engaging drive gear 76, a worm drive 80 driven by reduction gear 78, and a drive shaft 81 connected between worm drive 80 and vane 52. Worm drive 80 includes a worm shaft 82, a worm 84 on shaft 82, and a worm gear 86 engaging worm 84 to turn shaft 81 and vane 52.

Figure 10:
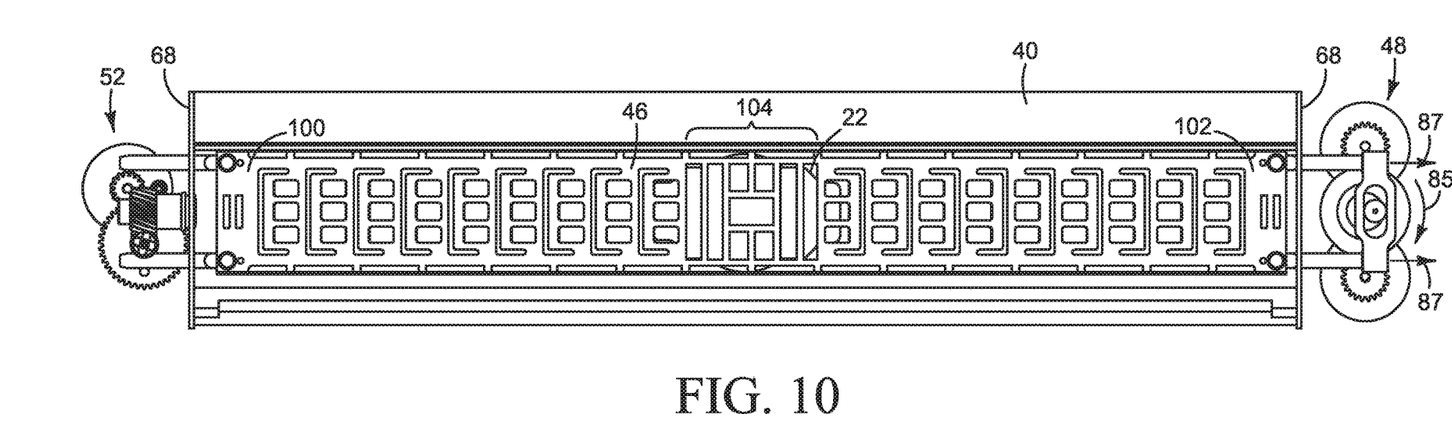
FIGS. 10-13 are plan views illustrating one example for the motion of the powder distributor plate in the example feeder shown in FIGS. 3-7.
Figure 11:
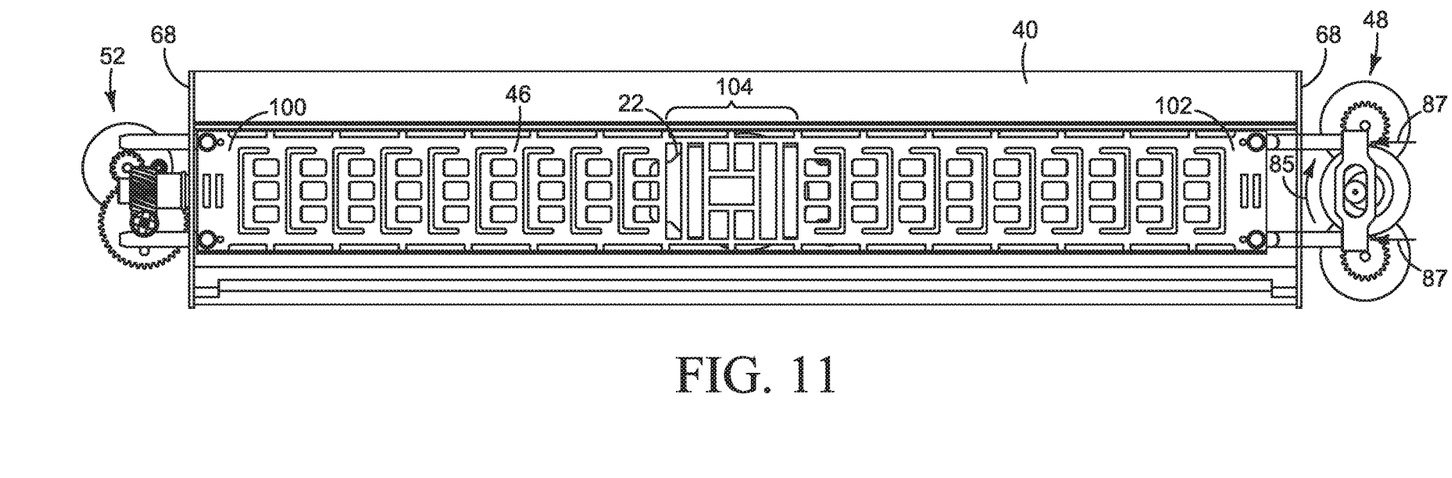
Figure 12:
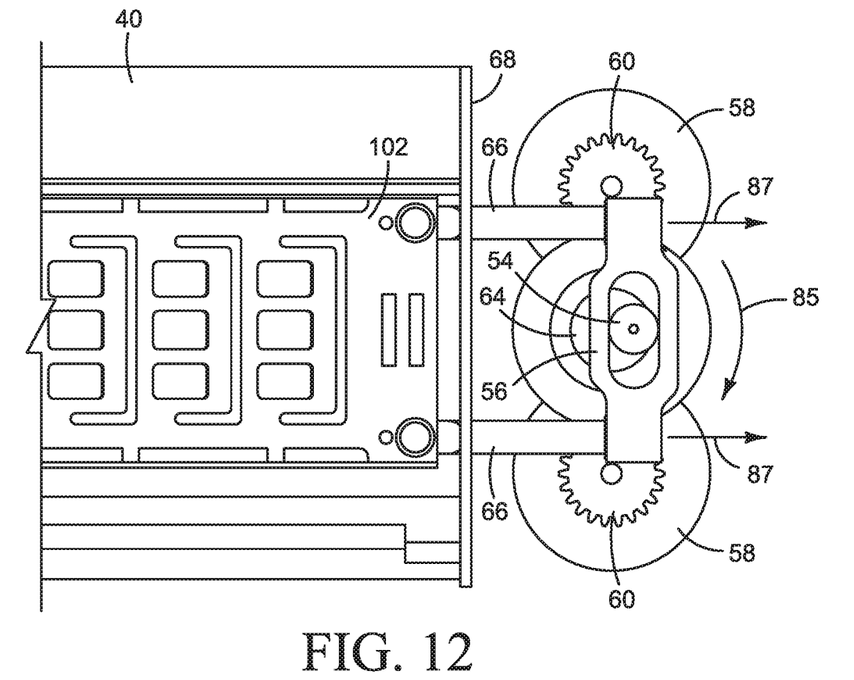
Figure 13:
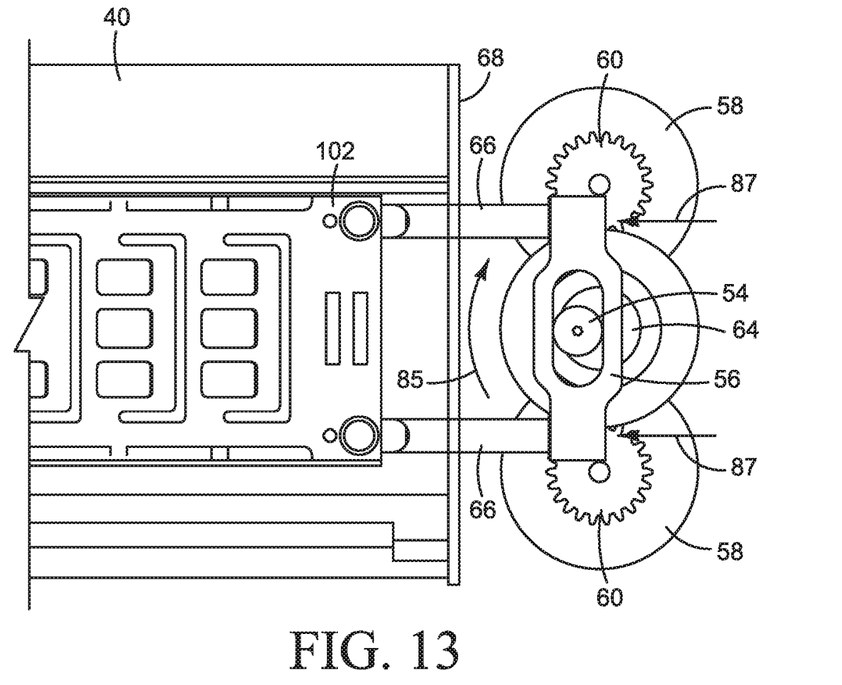
Figure 14:
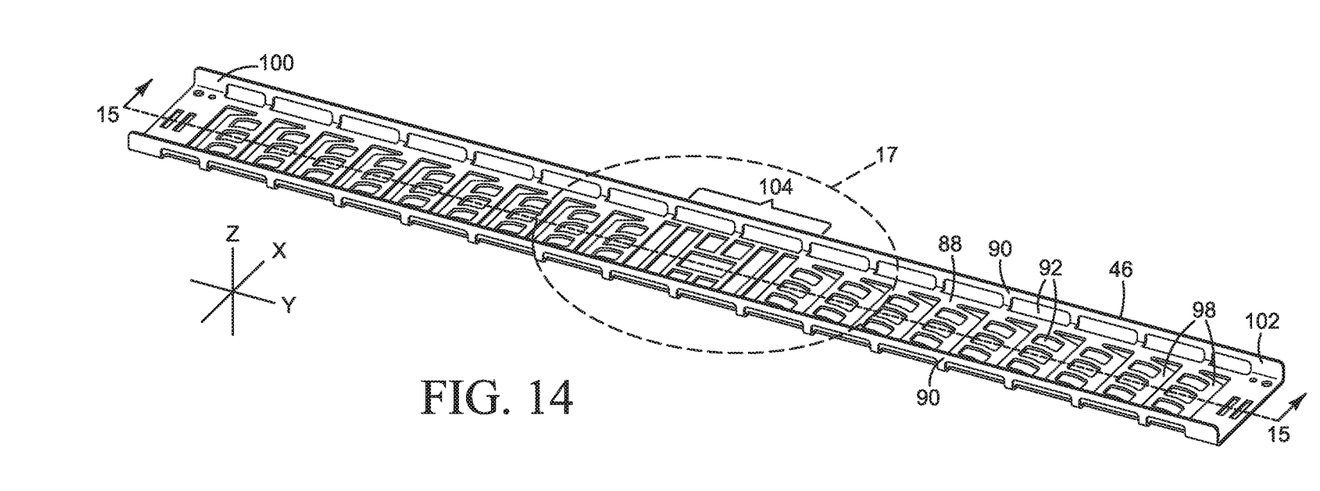
FIG. 14 is a perspective of the powder distributor plate in the example feeder shown in FIGS. 3-13.
Figure 15:
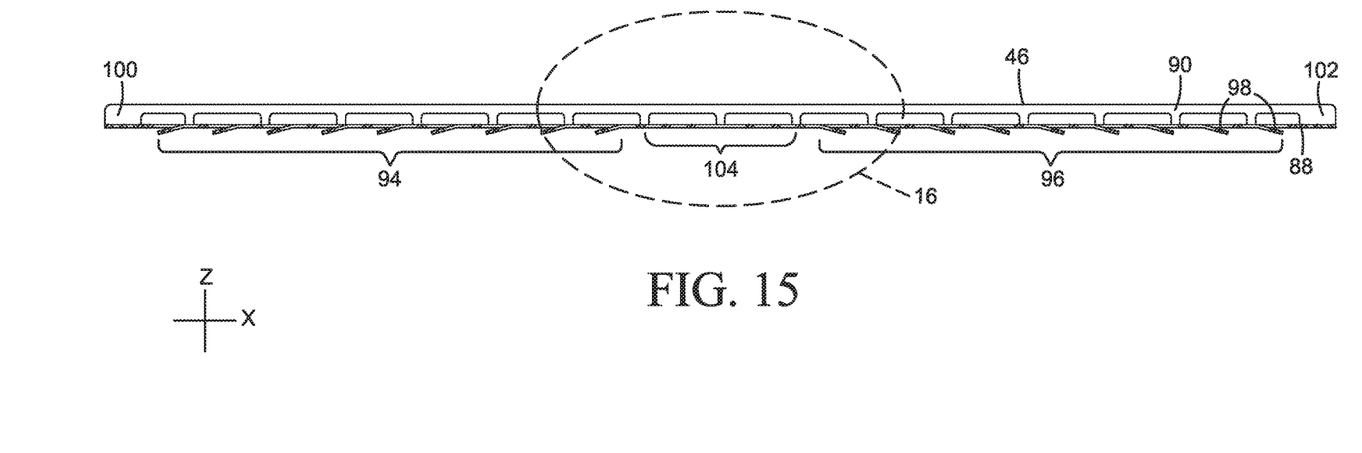
FIG. 15 is a section taken along the line 15-15 in FIG. 14.
Figure 16:
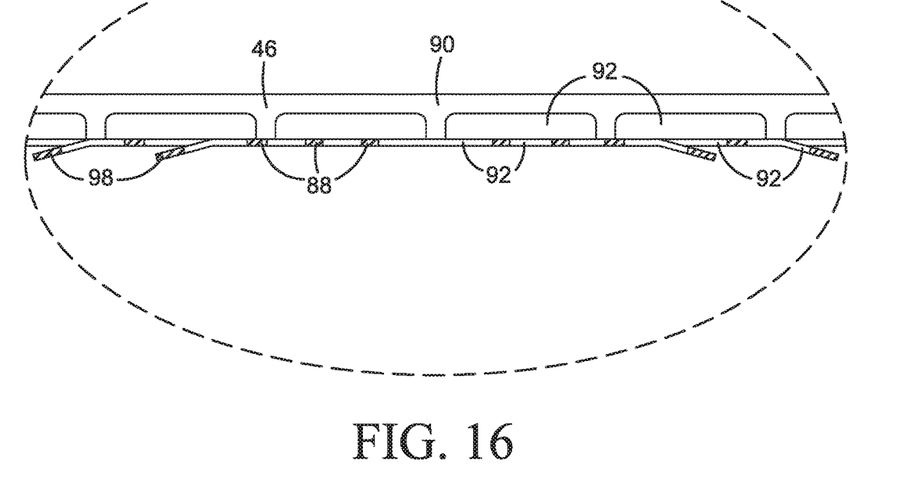
FIG. 16 is a detail from FIG. 15.
Figure 17:
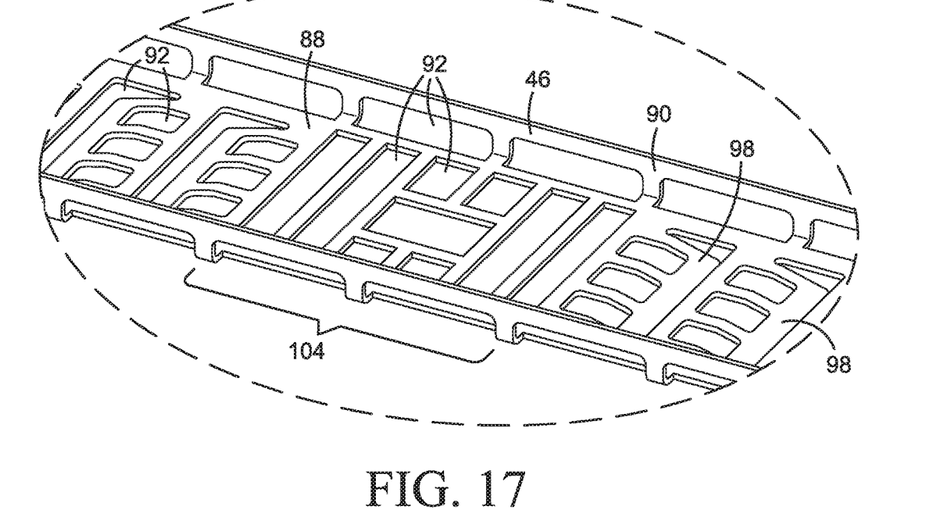
FIG. 17 is a detail from FIG. 14.

The reciprocating motion of plate 46 is shown in FIGS. 10-13. Vane 50 is omitted from the plan view of FIGS. 10-13 to more clearly illustrate the motion of plate 46. In FIGS. 10 and 12, eccentric 54 is moving clockwise through 3 o'clock in its circle of rotation and, accordingly, follower 56 and thus plate 46 are moving to the right at the far right end of the range of linear motion. In FIGS. 11 and 13, eccentric 54 is moving through 9 o'clock in its circle of rotation and, accordingly, follower 56 and thus plate 46 are moving to left at the far left end of the range of linear motion. Rotation of eccentric 54 is indicated by curved arrows 85 and linear motion is indicated by straight arrows 87 in FIGS. 10-13. Although an eccentric is used in linear actuator 48 in this example, any suitable mechanism may be used to vibrate plate 46. Also, while distributor 42 includes multiple motors 58 in the example shown, it may be possible (and desirable) in other examples to use a single motor 58 to drive plate 46.

Referring now to FIGS. 14-17, distributor plate 46 includes a floor 88 that lies in an XY plane and a sidewall 90 extending lengthwise along each side of floor 88 in a YZ plane. Holes 92 in floor 88 and sidewalls 90 allow powder to move freely through the floor and sidewalls. Distributor 42 also includes two groups 94, 96 of ramps 98 each intersecting the floor 88 of plate 46 at one or more of the holes 92. Each ramp 98 slopes away from the bottom of plate floor 88 at an angle less than 90°. The ramps 98 in each group 94, 96 are located on opposite sides of floor 88 and slope down and out, away from the bottom of floor 88 and outboard toward each end 100, 102. There are no ramps in a middle part 104 of plate 46 over powder inlet 22 (powder inlet 22 is shown in FIGS. 4, 5 and 18-22). In this example, ramps 98 and plate 46 are integrated into a single structure. In other examples, ramps 98 could be distinct parts connected to plate 46.

Referring now also to FIGS. 18-22, powder 18 is augered, pumped or otherwise fed into trough 40 through inlet 22, as indicated by arrows 106, and distributed along the length of the trough from inlet 22 toward each end 100, 102 by vibrating plate 46, as indicated by arrows 108. Plate 46 reciprocates linearly back and forth at the urging of actuator 48 (FIGS. 12 and 13) moving ramps 98 in groups 94, 96 on each side of inlet 22 alternately through an outboard stroke and an inboard stroke. The outboard stroke for ramps 98 in one group 94, 96 is the inboard stroke for ramps 98 in the other group 94, 96. On the outboard stroke, each ramp 98 scoops powder 18 and pushes it up through holes 92 and out toward the end of the trough. On the inboard stroke, each ramp 98 pushes powder 18 down and toward the middle of the trough. For each stroke, powder 18 under plate 46 on one side is moving toward the center of trough 40 while powder 18 above plate 46 on the other side is moving toward the end of trough 40. Powder can be distributed effectively along trough 40 because the powder above the plate can move with less friction than the powder below the plate. Thus, the rapid reciprocating motion of a vibrating plate 46 distributes powder from inlet 22 at middle part 104 simultaneously toward both ends 102 of trough 40.

Figure 18:
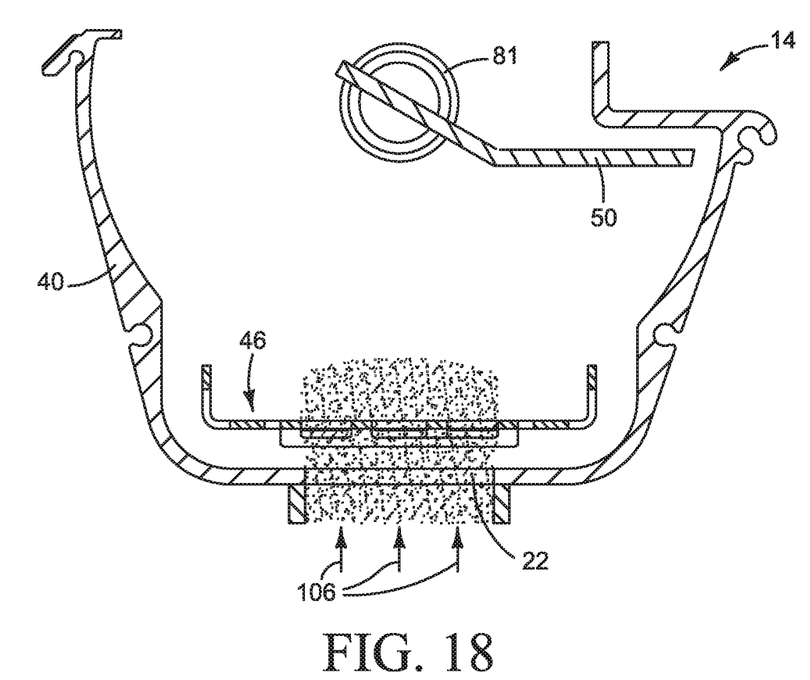
FIGS. 18-22 illustrate one example for distributing and dispensing powder with the example feeder shown in FIGS. 3-13.
Figure 19:
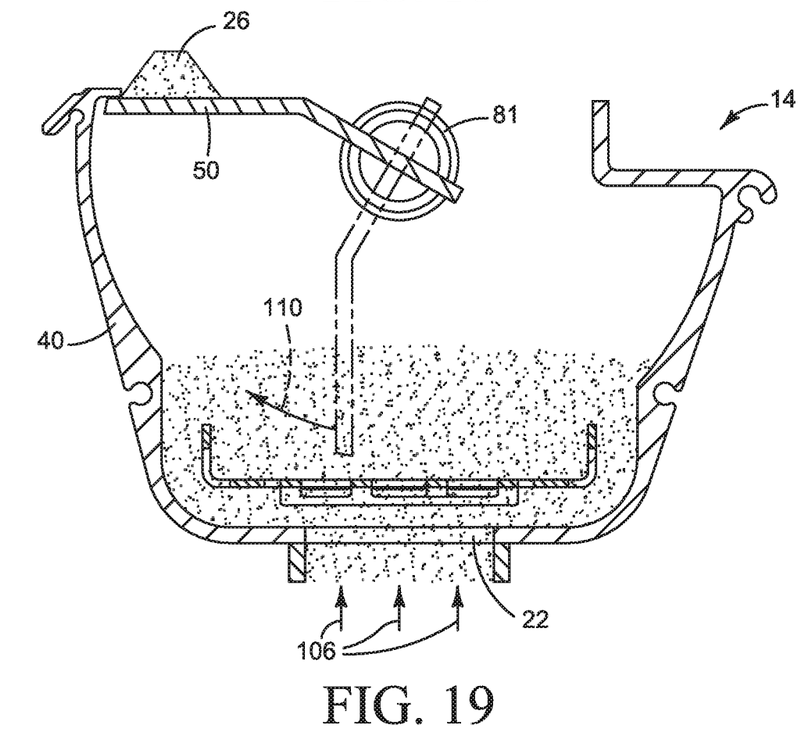
Figure 20:
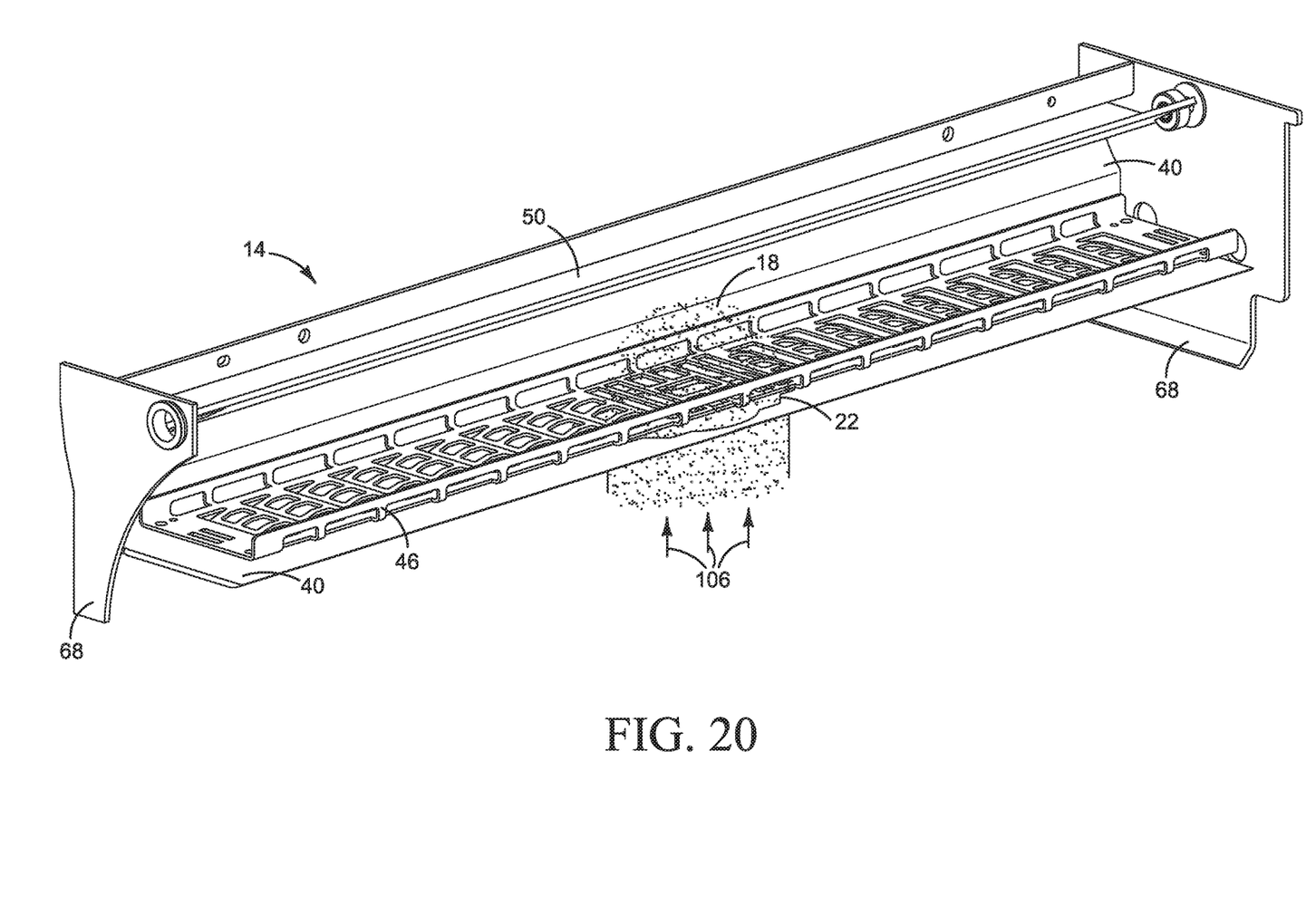
Figure 21:
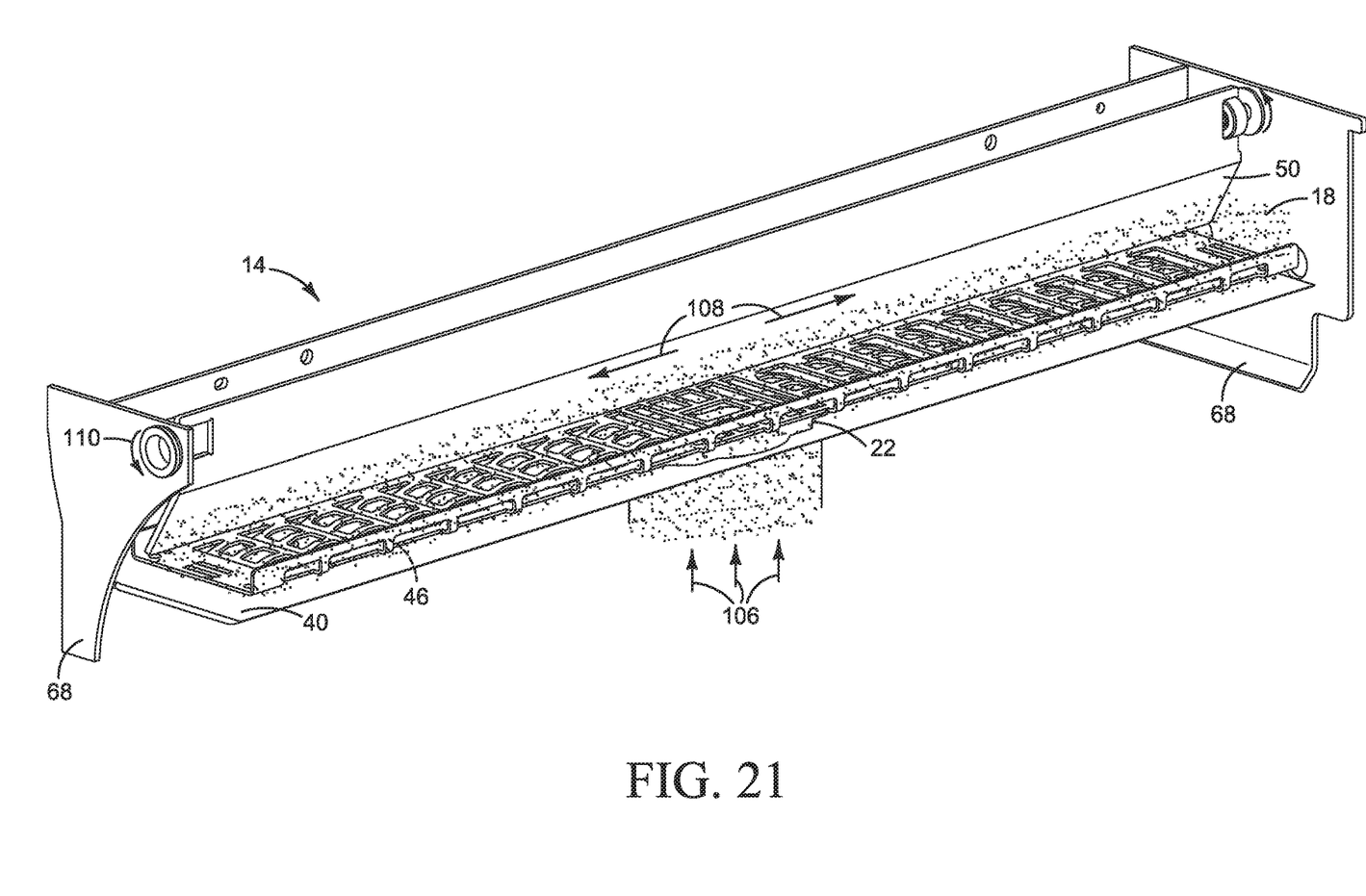

Vane 50 rotates from a home position shown in FIGS. 18 and 20 through powder 18 in FIG. 21 to an outlet position shown in FIGS. 19 and 22. Vane 50 is also shown sweeping through powder 18 in trough 40 in phantom lines in the section of FIG. 19. The rotation of vane 50 is indicated by arrow 110 in FIGS. 19 and 21. In the outlet position shown in FIGS. 19 and 22, a pile 26 of powder 18 is fed from trough 40, for example for presentation to a layering device in an additive manufacturing machine. At a steady state, in which the flow of powder 18 into trough 40 through inlet 22 matches the flow of powder 18 out of trough 40 along vane 50, the height of powder 18 in trough 40 will stay constant within a range for each cycle of vane 50 carrying powder 18 out of trough 40.

The number, size and shape of holes 92 and ramps 98, and the stroke length and speed of plate 46, may vary depending on the particle size and flow characteristics of powder 18 to achieve the desired powder flow along trough 40. For example, using the plate geometry shown in FIGS. 14-17, testing suggests a 6 mm stroke at a vibration frequency of 20 Hz will be sufficient to distribute a PA12 powder 18 along the length of plate 46 in a few seconds, for a typical size additive manufacturing work area 20 (FIGS. 1 and 2). Plate 46 may be configured to distribute powder 18 away from inlet 22 along trough 40 at the same rate of flow that powder 18 enters trough 40 through inlet 22. A powder feed cycle for layering in an additive manufacturing machine, for example, may take a few seconds. If the flow of powder 18 into trough 40 is continuous, then the level of powder inside trough 40 will go up and down during each cycle according to the sweep vane 50 through the powder. If the flow of powder into trough 40 is intermittent, timed according to the sweep of vane 50, then the level of powder inside trough 40 will remain substantially constant.

Any suitable control device may be used to control motors 58 and 72 and may be implemented as part of an integrated system controller or as a discrete feeder controller that coordinates with other system control functions. Suitable controllers may include multiple controller and microcontroller components such as, for example, general purpose processors, microprocessors, and application specific integrated circuits (ASICs).

The examples shown in the figures and described above illustrate but do not limit the patent, which is defined in the following Claims.

"A", "an", and "the" as used in the Claims means at least one.

The invention claimed is:

1. A powder distributor, comprising:
   an elongated trough having a top, a bottom, a first end, a second end opposite the first end, and a middle part between the first end and the second end;
   an inlet into the bottom of the trough through which powder may enter the trough; and
   an apertured plate inside the trough over the inlet, the plate movable to distribute powder lengthwise from the inlet along the trough.

2. The powder distributor of claim 1, where the inlet is located in the middle part of the trough and the plate is movable back and forth to distribute powder from the inlet in opposite directions toward both ends of the trough.

3. The powder distributor of claim 2, where the plate is vibrate-able to distribute powder from the inlet simultaneously toward both ends of the trough.

4. The powder distributor of claim 3, comprising a linear actuator to vibrate the plate.

5. The powder distributor of claim 4, where the plate is to distribute powder away from the inlet along the trough at the same rate of flow that the powder enters the trough through the inlet.

6. An article for distributing powder, comprising:
   a plate having holes therein through which a powder may pass from a first side of the plate to a second side of the plate opposite the first side;
   multiple first ramps each intersecting the plate at one or multiple holes and sloping away from the first side of the plate in a first direction at an angle less than 90°; and
   multiple second ramps each intersecting the plate at one or multiple holes and sloping away from the first side of the plate in a second direction opposite the first direction at an angle less than 90°.

7. The article of claim 6, where the ramps are integral to the plate.

8. The article of claim 7, where the plate includes:
   a floor extending lengthwise in an X direction and widthwise in a Y direction perpendicular to the X direction such that the floor lies in an XY plane;
   a first sidewall intersecting a first side of the floor and extending along the first side of the floor in the X direction;
   a second sidewall intersecting a second side of the floor and extending along the second side of the floor in the X direction parallel to the first sidewall; and where
   some of the holes are in the floor and some of the holes are in the sidewalls; and
   the ramps protrude from the plane of the floor in a Z direction perpendicular to the X and Y directions.

9. A powder feeder, comprising:
   a trough;
   an elongated distributor to distribute powder along a length of the trough;
   an elongated dispenser to dispense powder from along the length of the trough;
   an apertured plate inside the trough, the plate including two groups of ramps protruding from a bottom plane of the plate, the ramps in one group sloping down and away toward one end of the plate and the ramps in the second group sloping down and away toward the other end of the plate; and
   a linear actuator to vibrate the plate.

10. The feeder of claim 9, where the dispenser includes:
    a rotatable vane that extends along the length of the trough on an axis of rotation; and
    a rotary actuator to rotate the vane such that the vane sweeps through powder in the trough as the vane rotates on the axis.

11. The feeder of claim 9, where the linear actuator includes:
    an eccentric;
    a motor to turn the eccentric; and
    a follower connected between the eccentric and the plate to vibrate the plate at the urging of a turning eccentric.

* * * * *